(12) United States Patent
     Lee

(10) Patent No.: US 12,624,991 B2
(45) Date of Patent: May 12, 2026

(54) LASER POWER DETECTION USING NORMALIZED LINEAR SLICES TO CONSTRUCT GAUSSIAN PROFILES

(71) Applicant: Fenix Research Corporation, Palo Alto, CA (US)

(72) Inventor: Yong Jin Lee, Palo Alto, CA (US)

(73) Assignee: Fenix Research Corporation, Palo Alto, CA (US)

( * ) Notice: Subject to any disclaimer, the term of this patent is extended or adjusted under 35 U.S.C. 154(b) by 135 days.

(21) Appl. No.: 18/889,770

(22) Filed: Sep. 19, 2024

(65) Prior Publication Data

US 2026/0085973 A1      Mar. 26, 2026

Related U.S. Application Data

(60) Provisional application No. 63/625,465, filed on Jan. 26, 2024, provisional application No. 63/625,468, filed on Jan. 26, 2024.

(51) Int. Cl.
    *G01J 1/42*          (2006.01)
    *G01J 1/44*          (2006.01)
    *H01S 3/00*          (2006.01)

(52) U.S. Cl.
    CPC .............. *G01J 1/4257* (2013.01); *G01J 1/44* (2013.01); *H01S 3/0014* (2013.01)

(58) Field of Classification Search
    CPC ... G01J 2001/4261; G01J 1/44; H01S 3/0014; H01S 3/0007
    See application file for complete search history.

(56)                References Cited

U.S. PATENT DOCUMENTS 5,521,374 A * 5/1996 Cray ..................... G01J 1/4257
                                                           356/123
6,792,028 B2   9/2004 Cook et al.
                     (Continued)

FOREIGN PATENT DOCUMENTS

CN       111037126 A * 4/2020 ............ G01J 1/0411
DE       19851010 B4   10/2010
                     (Continued)

OTHER PUBLICATIONS

Extended European Search Report dated Jun. 17, 2025, European Patent Application No. 25152882.4.
(Continued)

*Primary Examiner* — Michael P LaPage
(74) *Attorney, Agent, or Firm* — Pearl Cohen Zedek Latzer Baratz LLP

(57)                ABSTRACT

A system and method are provided for determining total laser power with photodiode sensors used to measure irradiance from the beam strike of the laser to identify linear offset Gaussian slices. The Gaussian for the slices is then solved to obtain a Gaussian profile, wherein solving to obtain the Gaussian profile includes: measuring an angle of incidence of a central axis of the laser beam relative to a normal axis of a plane containing the photodiode sensors; measuring a positional offset of the plane of the photodiode sensors relative to a plane perpendicular to the central axis of the laser beam; creating a projection of the plane of the photodiode sensors onto the plane perpendicular to a propagation of the beam to provide centered linear slices; and constructing the Gaussian profile from the centered linear slices. The total laser power is then determined from the Gaussian profile.

20 Claims, 14 Drawing Sheets

(56) References Cited

U.S. PATENT DOCUMENTS

| 2007/0296970 | A1 | 12/2007 | Crow et al. |
| 2008/0198371 | A1 | 8/2008 | Widen |
| 2012/0087542 | A1* | 4/2012 | Schertler .............. G01S 7/4804 |
| | | | 382/103 |
| 2012/0314210 | A1* | 12/2012 | Wick, Jr. ............. G01J 1/4257 |
| | | | 356/121 |
| 2015/0331082 | A1 | 11/2015 | Zollars et al. |
| 2017/0269154 | A1* | 9/2017 | Torres .................. H01S 3/0071 |
| 2022/0026339 | A1* | 1/2022 | Nguyen ............... G01J 1/4257 |
| 2023/0296432 | A1 | 9/2023 | Kowarz |
| 2025/0244173 | A1 | 7/2025 | Lee |
| 2025/0244436 | A1 | 7/2025 | Lee |

FOREIGN PATENT DOCUMENTS

| RU | 2594953 C2 * | 8/2016 | ............... G01J 5/18 |
| WO | WO2010/054977 A1 | 5/2010 | |

OTHER PUBLICATIONS

Extended European Search Report dated Jun. 17, 2025, European Patent Application No. 25152908.7.

Extended European Search Report dated Jun. 30, 2025, European Patent Application No. 25152812.1.

Response to Communication Pursuant to Rules 69 and 70a(1) EPC dated Jan. 23, 2026, European Patent Application No. 25152882.4.

Response to Communication Pursuant to Rules 69 and 70a(1) EPC dated Jan. 20, 2026, European Patent Application No. 25152908.7.

Response to Communication Pursuant to Rules 69 and 70a(1) EPC dated Jan. 27, 2026, European Patent Application No. 25152812.1.

* cited by examiner

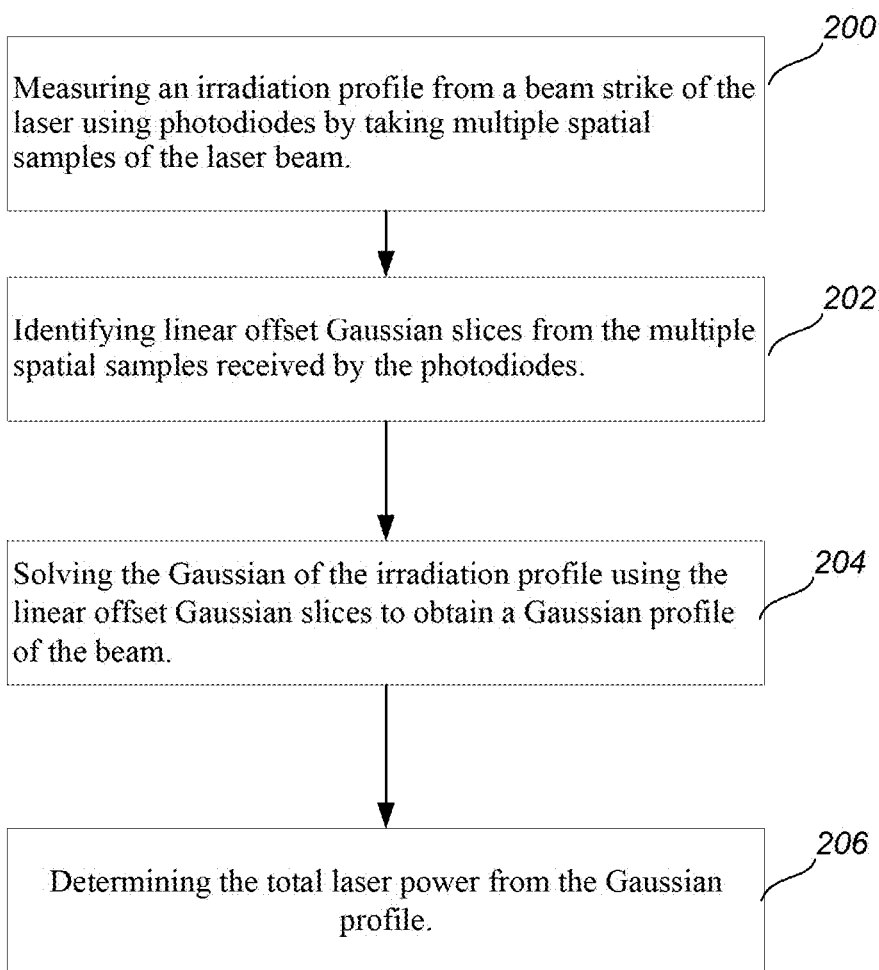

*200*

Measuring an irradiation profile from a beam strike of the laser using photodiodes by taking multiple spatial samples of the laser beam.

*202*

Identifying linear offset Gaussian slices from the multiple spatial samples received by the photodiodes.

*204*

Solving the Gaussian of the irradiation profile using the linear offset Gaussian slices to obtain a Gaussian profile of the beam.

*206*

Determining the total laser power from the Gaussian profile.

FIG. 2

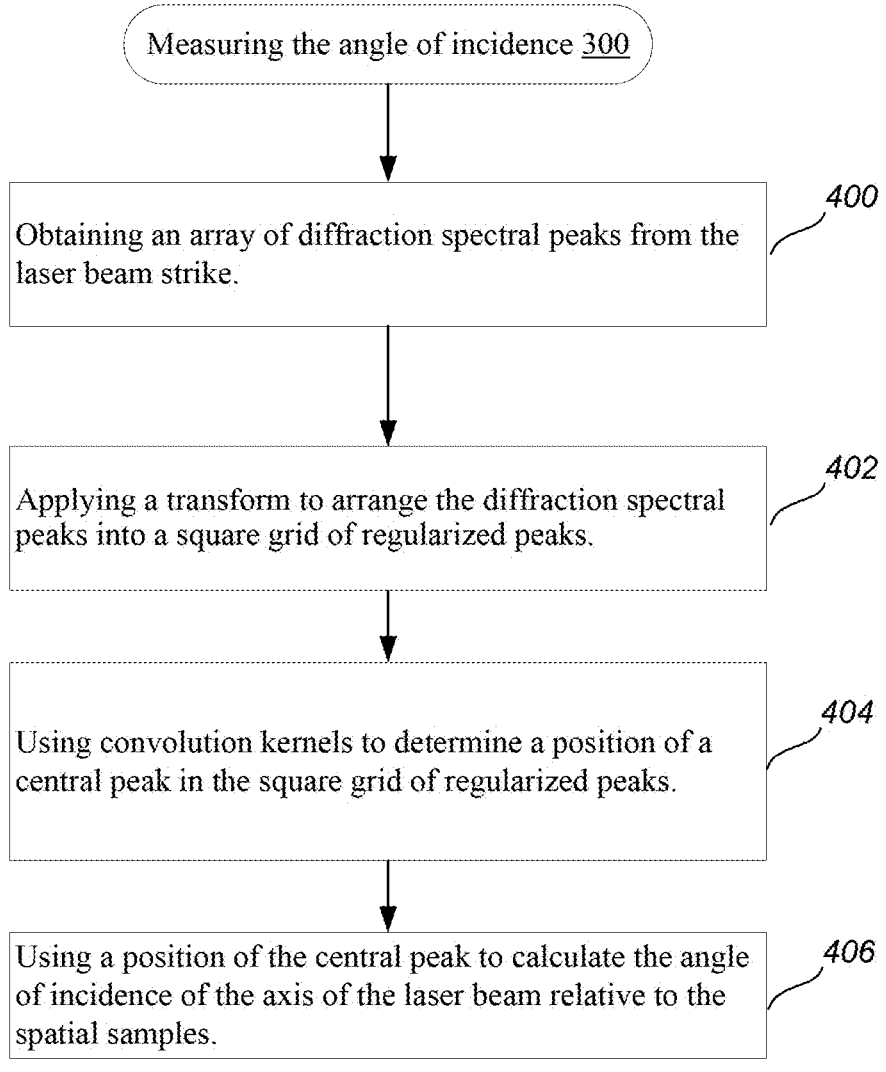

Measuring the angle of incidence 300

Obtaining an array of diffraction spectral peaks from the laser beam strike. 400

Applying a transform to arrange the diffraction spectral peaks into a square grid of regularized peaks. 402

Using convolution kernels to determine a position of a central peak in the square grid of regularized peaks. 404

Using a position of the central peak to calculate the angle of incidence of the axis of the laser beam relative to the spatial samples. 406

FIG. 4

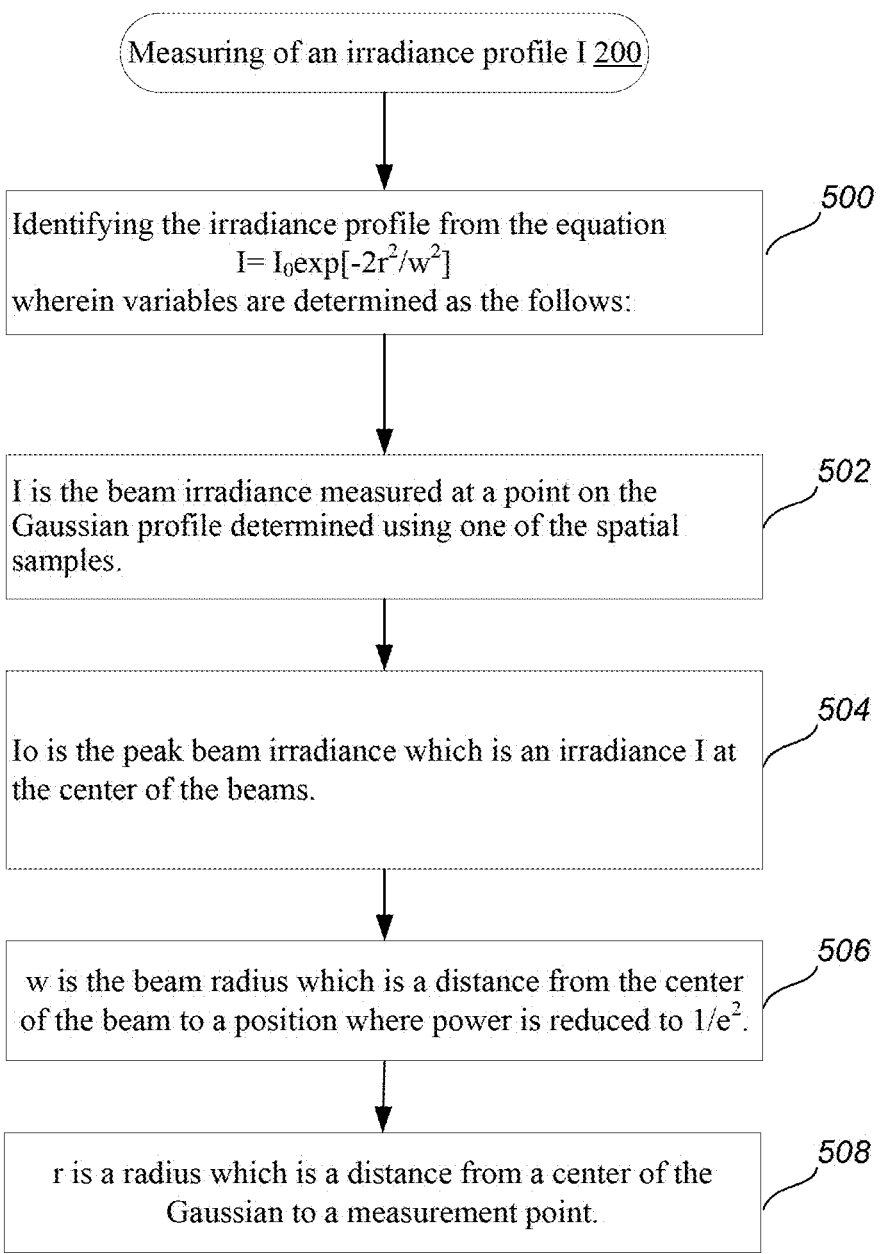

Measuring of an irradiance profile I 200

Identifying the irradiance profile from the equation
$I = I_0 \exp[-2r^2/w^2]$
wherein variables are determined as the follows: 500

I is the beam irradiance measured at a point on the Gaussian profile determined using one of the spatial samples. 502

Io is the peak beam irradiance which is an irradiance I at the center of the beams. 504 w is the beam radius which is a distance from the center of the beam to a position where power is reduced to $1/e^2$. 506 r is a radius which is a distance from a center of the Gaussian to a measurement point. 508

FIG. 5

Positional Offset

Angle of Incidence

604
Photodiode
Power Detector

602

Laser Source

700

Irradiance I = watts/meters²

Distance from center of beam in meters 806
slice 1

808
slice 2

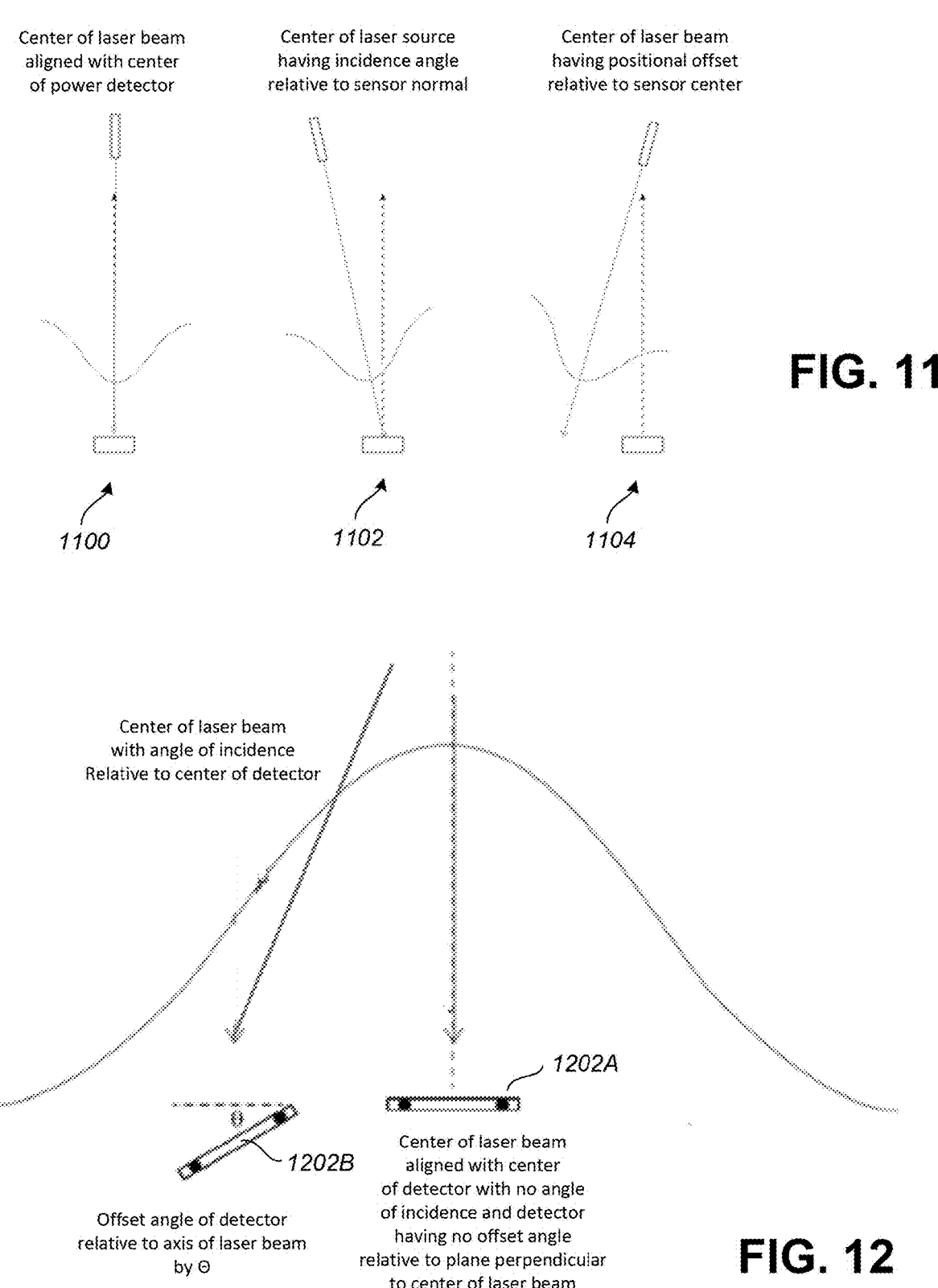

Center of laser beam
aligned with center
of power detector

Center of laser source
having incidence angle
relative to sensor normal

Center of laser beam
having positional offset
relative to sensor center

Center of laser beam
with angle of incidence
Relative to center of detector

1202A

1202B

Offset angle of detector
relative to axis of laser beam
by Θ

Center of laser beam
aligned with center
of detector with no angle
of incidence and detector
having no offset angle
relative to plane perpendicular
to center of laser beam

FIG. 12

*1300* Plane of Sensors
With Rotated Offset Axis

*1302* Plane of Sensors
Normalized

*1302* Projection of
Plane of Sensors

*1400*
Laser Beam
Origin O

Error Analysis
(For Discarding Samples)

*1700* Photodiode Detector Plane

*1702* Photodiodes

*1710* Photodiode Detector Plane

*1712*
Photodiodes

LASER POWER DETECTION USING NORMALIZED LINEAR SLICES TO CONSTRUCT GAUSSIAN PROFILES

CLAIM FOR PRIORITY

This application claims priority to U.S. Provisional Application No. 63/625,468, filed on Jan. 26, 2024 and titled "Laser Power Detection" and U.S. Provisional Application No. 63/625,465, filed on Jan. 26, 2024 and titled "Laser Detector", the contents of which are incorporated by reference herein in its entirety.

FIELD

Embodiments of the present technology generally relate to detection of a laser, and more specifically relate to detection of the power of the laser.

BACKGROUND

Laser detectors have been provided to determine when a laser is being used to target a vehicle, such as a laser used by police to determine if a vehicle is speeding. The laser detector notifies the user of the existence of such a laser source. Lasers have also been used to target pilots in aircraft. Such a laser beam strike can cause temporary or even permanent blindness of the pilot. Accurate and fast detection of such a laser using a laser detector that is provided in the aircraft to alert the pilot is desirable. It is desirable to determine characteristics of the laser source to determine if the laser is harmful to the pilot. It is also desirable to identify the location of the laser as quickly as possible to alert authorities to enable them to find the laser source and prevent further attempts to cause harm to pilots. Laser detectors can also be used to identify laser designators and optical range finders, allowing aircraft crew to take evasive action and address potential threats.

SUMMARY

Embodiments described herein provide a system and method for determining total power and maximum irradiance for a laser. The method first measures an irradiation profile from a beam strike of the laser by taking multiple spatial samples of the laser beam strike to identify linear offset Gaussian slices used to solve for a Gaussian of the irradiation profile. Next, the method solves the Gaussian of the irradiation profile to obtain a Gaussian profile of the beam, where solving to obtain the Gaussian profile includes the following steps: measuring an angle of incidence of a central axis of the laser beam relative to a normal axis of a plane containing the multiple spatial samples; measuring a positional offset of the plane containing the multiple spatial samples relative to a plane perpendicular to the central axis of the laser beam; creating a projection of the plane containing the multiple spatial samples onto the plane perpendicular to a propagation of the beam for the Gaussian profile using the positional offset to provide centered linear slices; and constructing the Gaussian profile from the centered linear slices using the angle of incidence. Total laser power is then determined by taking an integral of the centered Gaussian profile.

Certain embodiments are provided for the step of measuring the angle of incidence which is done by obtaining an array of diffraction spectral peaks from photodiodes exposed to the laser beam strike. A transform is applied to arrange the diffraction spectral peaks into a square grid of regularized peaks. Convolution kernels are then used to determine the position of a central peak of the square grid of regularized peaks. The angle of incidence of the axis of the laser beam is then calculated using a position of the central peak.

In the method embodiments, the multiple spatial samples are measurements of irradiance, I, used to calculate the Gaussian profile wherein the irradiance is $I=I_0 \exp [-2r^2/w^2]$. The value I is then the beam irradiance measured at a point on the Gaussian profile determined using one of the spatial samples. The value Io is the peak beam irradiance which is an irradiance I at the center of the beam. The value w is the beam radius which is a distance from the center of the beam to a position where power is reduced to $1/e^2$. The value r is a distance from a center of the Gaussian to a measurement point. Irradiance I can then be used to determine the total power P of the laser beam.

In embodiments, the values for Io, w and r are determined for one of the linear offset Gaussian slices obtained from a pair of the photodiodes providing the spatial samples. In some embodiments, iterations are provided to refine the Gaussian profile by using additional pairs of the photodiodes providing spatial samples to provide additional linear offset Gaussian slices to determine the Gaussian profile. The peak irradiation power Io, or the highest value determined for Io is used to determine if a pilot or other individual could have been exposed to maximum permissible exposure (MPE) of the laser.

Certain embodiments identify beams which are non-lasers so that only laser lights which can be harmful are evaluated. In an embodiment, it is determined if multiple spatial samples are sensing light from a non-laser signal by oversampling points when taking the multiple spatial samples and determining if the oversampled points correspond to a fitted Gaussian. In another embodiment, non-lasers are detected by determining if multiple wavelengths are obtained from the multiple spatial samples. In another embodiment, non-lasers are detected by determining if the spatial samples are sensing light from a non-laser by determining pulse rate and pulse width of light from the multiple spatial samples.

Further embodiments provide an apparatus for determining total laser power. The apparatus includes photodiode sensors arranged in a plane and configured to take multiple spatial samples of an irradiation profile from a beam strike of the laser to identify linear offset Gaussian slices used to solve for a Gaussian of the irradiation profile. The apparatus further includes a processor connected to the photodiode sensors, with the processor configured to perform the following steps: measure an angle of incidence of a central axis of the laser beam relative to a normal axis of the plane with the multiple spatial samples; measure a positional offset of a plane of the photodiode sensors relative to a plane perpendicular to the central axis of the laser beam; create a projection of the plane containing the multiple spatial samples onto the plane perpendicular to a propagation of the beam for the Gaussian profile using the positional offset creating centered linear slices; construct the Gaussian profile from the centered linear slices using the angle of incidence; and then determine the total laser power from the Gaussian profile.

In certain embodiments to measure the angle of incidence of the axis of the laser beam, the apparatus further includes a diffraction grating with sensors configured to provide an array of diffraction spectral peaks from the beam strike. The processor is connected to the diffraction grating with sensors and is further configured to measure the angle of incidence by: applying a transform to arrange the diffraction spectral peaks into a square grid of regularized peaks; using convolution kernels to determine a position of a central peak in the square grid of regularized peaks; and using a position of the central peak to calculate the angle of incidence of the axis of the laser beam relative to the diffraction grating.

Further embodiments provide a non-transitory computer readable medium comprising stored instructions which when executed by a processor cause the processor to perform certain steps. The steps first include measuring an irradiation profile from a beam strike of the laser by taking multiple spatial samples of the laser beam strike to identify linear offset Gaussian slices used to solve for a Gaussian of the irradiation profile. The steps additionally include solving the Gaussian of the irradiation profile to obtain a Gaussian profile of the beam, wherein solving to obtain the Gaussian profile includes steps to: measure an angle of incidence of a central axis of the laser beam relative to a normal axis of a plane containing the multiple spatial samples; measure a positional axis of the plane containing the multiple spatial samples relative to a plane perpendicular to the central axis of the laser beam; create a projection of the plane containing the multiple spatial samples onto the plane perpendicular to a propagation of the beam for the Gaussian profile using the positional offset to provide centered linear slices; and construct the Gaussian profile from the centered linear slices using the angle of incidence; and determine the total laser power from the Gaussian profile.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 is a high level flow diagram of one embodiment of a method for detecting the power of a laser according to embodiments.

FIG. 4 is a high level flow diagram of one embodiment of steps to determine the angle of incidence from the method step of FIG. 2.

FIG. 5 is a high level flow diagram of one embodiment of steps to measure the irradiance profile I from the method step of FIG. 2.

FIG. 11 provides block diagrams showing a laser source and power detector to illustrate an angle of incidence of the center of a laser beam relative to the center of a power detector as well as an offset angle of the power detector.

FIG. 12 further illustrates the offset angle and angle of incidence from FIG. 11 by providing a two dimensional block diagram of a slice of the laser beam and showing relative positions for power detectors to illustrate the offset angle and angle of incidence measurement.

DETAILED DESCRIPTION

Certain embodiments described herein provide a laser power detector that can be used to determine if a laser source beam has sufficient power to cause eye damage to a pilot. In particular, the laser power detector includes an array of photodiodes arranged on a plane that can be provided in an aircraft along with other devices to determine the position of the laser beam relative to the power detector to enable determination of the power level of the laser.

A problem with accurately determining the power of a laser includes the fact that the laser beam can be hitting the aircraft at a skewed angle so that the center of the beam, or maximum irradiance of the beam is not incident on the detector. A solution provided by certain embodiments described herein is to provide for a determination of the angle of incidence of the laser beam and the offset of the beam center relative to the sensor so that if the beam is not directly incident upon the detector, the region of the beam that is incident on the detector can be determined and the power level of the peak of the beam can be calculated from the offset beam.

Figure 1:
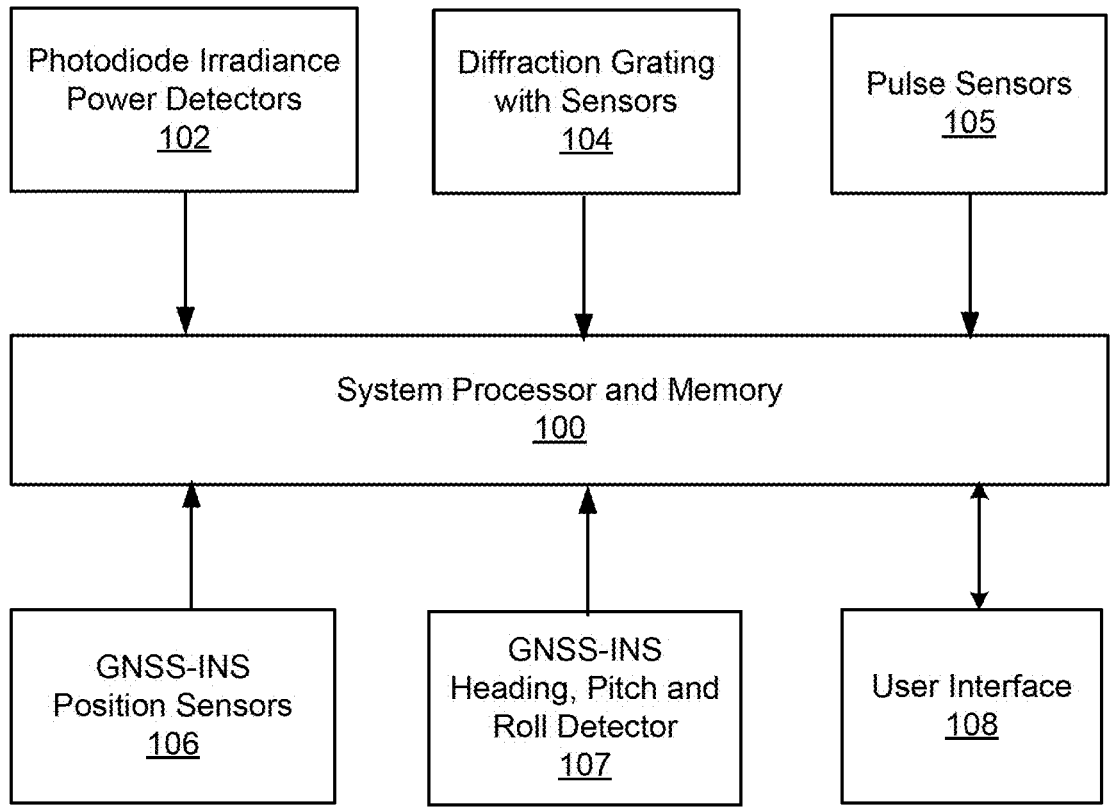
FIG. 1 is a high level block diagram of a system for detecting the power of a laser according to embodiments.

FIG. 1 is a high level block diagram of a system for detecting the power of a laser according to embodiments described herein. The system includes a system processor and memory 100 which serves as the system control unit. The system further includes photodiode irradiance power sensors 102 to detect power from a laser beam, the photo-diode irradiance power sensors providing output signals to the system processor and memory 100. Further, to determine the position of the laser source relative to the photodiode irradiance power sensors and to characterize the source as a laser, the system includes a diffraction grating with sensors 104 that provides output signals to the system processor and memory 100. In addition to the diffraction grating with sensors 104, to determine if a light source detected is a laser as opposed to a non-laser source, a pulse sensor 105 is further included. To further determine position of the system itself relative to the laser source to enable calculation of laser beam power, the system includes global navigation satellite system (GNSS) and inertial navigation system (INS) position system sensors 106 that provide signals to the system processor and memory 100. When mounted on an aircraft, the GNSS-INS system 106 provides the aircraft latitude, longitude, elevation and attitude. This set of information can be used to compute the location of the laser source relative to the laser detector containing the components of the system of FIG. 1. To further compute the position of the laser source, a GNSS-INS heading, pitch and roll detector 107 is included that provides any offset of the laser detector relative to the laser source due to a tilt angle of the laser detector. Finally, the system includes a user interface 108 that is connected to the system sensors 106 to enable a user to receive warnings about laser strikes as well as to request and receive further information about a laser source. Examples of the user interface 108 include a display screen, keypad or keyboard, and touchscreen or mouse interface. The user interface 108 can be provided separate from the laser detector and connected through a wireless interface to send and receive data from the laser detector.

In embodiments described herein the user interface 108 provides information about the power level and other characteristics of a laser source to the user on a display and can provide audio alerts so that the user can identify a harmful laser source. The user can be an aircraft pilot, an operator of a ground-based vehicle or an individual who is not using a vehicle that is using the detector to identify a laser source with harmful power levels on foot. The user interface 108 can provide an audio alert when a beam strike occurs with a irradiance level that could cause temporary or permanent blindness. The laser power level can also be displayed to let the pilot or vehicle operator know the extent of the danger the detected laser source poses. Other characteristics of the laser can be displayed to the user to enable the user to identify the laser source and locate the source so that the laser source can be reported by the user to authorities who can locate the source and eliminate the possibility of any further harm.

In further embodiments, the user interface 108 can operate with a transmitter to transmit the laser power as well as other identifying characteristics of the laser to authorities separate from an operator using the laser detector. With such a transmitter, authorities can be quickly alerted about a laser source with a harmful power level being detected along with location and other information to detect the laser source immediately provided to the authorities who can take steps to eliminate the danger. Information in addition to the harmful power level, such as laser wavelength and beam propagation can help authorities identify the particular laser which can enable them to determine who might be operating the laser to enable location of the person using the laser along with position information provided from the laser detector.

FIG. 2 is a high level flow diagram of one embodiment of a method for detecting the power of a laser according to embodiments described herein. The steps of FIG. 2 are performed using the processor of the system processor and memory 100 in conjunction with the photodiode irradiance power sensors 102 of FIG. 1. In the first step 200, an irradiation profile from a beam strike of the laser is measured using the photodiodes of the photodiode irradiance power sensors 102 of FIG. 1 by taking multiple spatial samples of the laser beam. In step 202, the processor of the processor and memory 100 identifies linear offset Gaussian slices from the multiple spatial samples received by the photodiodes. In step 204, the linear offset Gaussian slices are used by the processor to solve the Gaussian of the irradiation profile to obtain the Gaussian profile of the laser beam. In step 206, the Gaussian profile of the laser beam is used to determine total laser power. The total laser power is found by taking the integral of the Gaussian profile.

Figure 3:
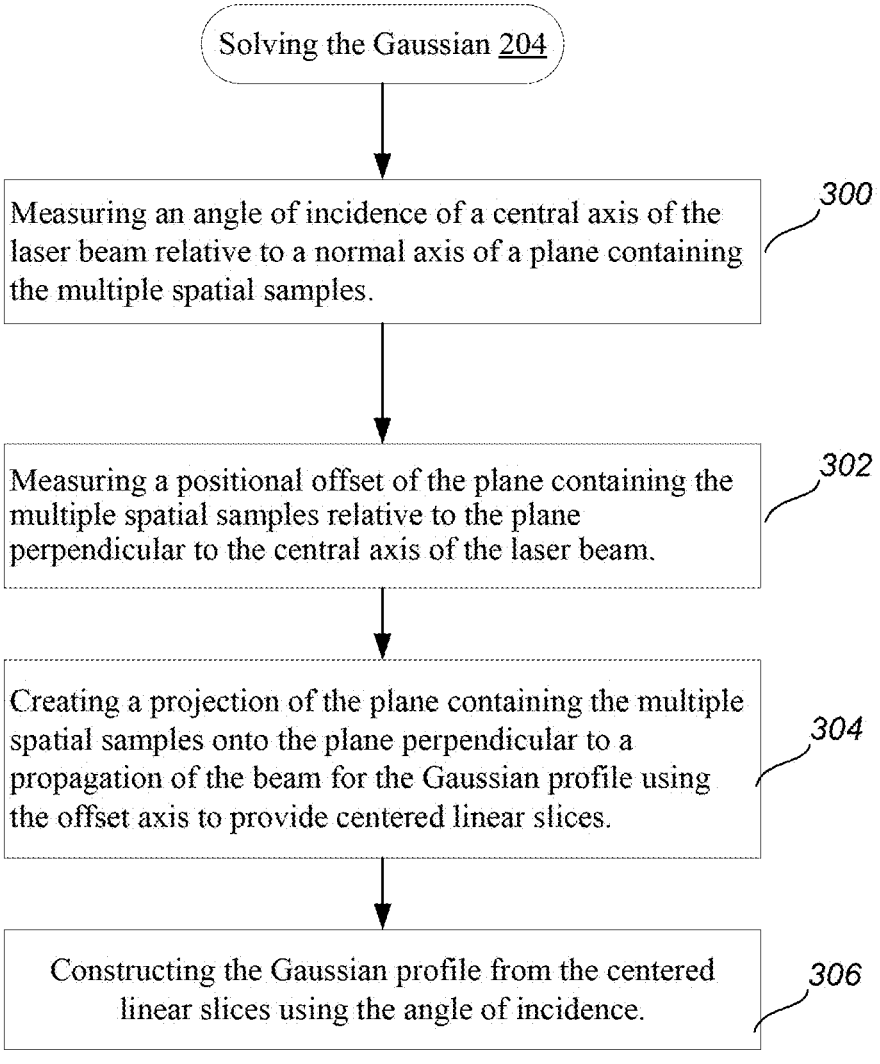
FIG. 3 is a high level flow diagram of one embodiment of steps to solve for the Gaussian from the method step of FIG. 2.
Figure 6:
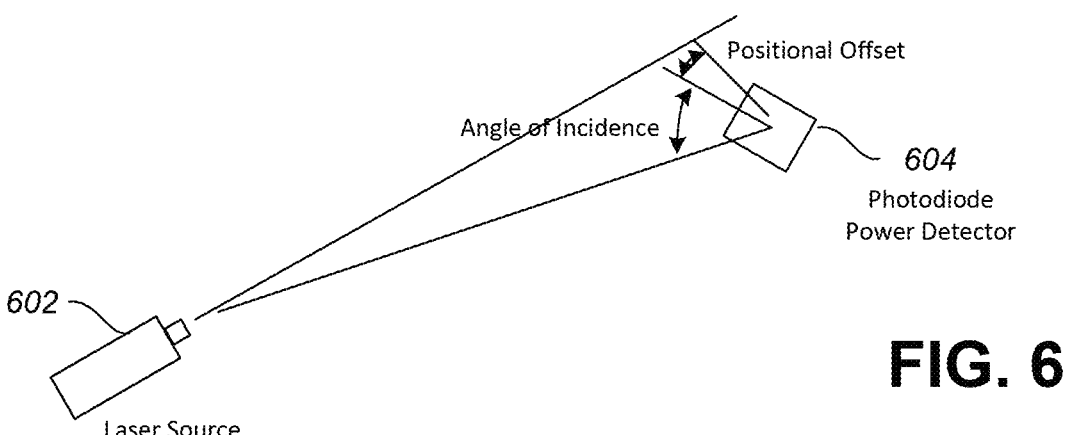
FIG. 6 is a block diagram showing a laser and plane of photodiodes of a laser detector that illustrates both an angle of incidence and an offset angle of the laser beam relative to the plane of photodiodes.

FIG. 3 is a high level flow diagram of one embodiment of steps to solve for the Gaussian from the method step 204 of FIG. 2. The steps of FIG. 3 are performed using the processor of the system processor and memory 100 along with the diffraction grating with sensors 104 and the heading, pitch and roll detector 107 of FIG. 1. In step 300, to solve for the Gaussian, the angle of incidence of the central axis of the laser beam is measured relative to a normal axis of a plane containing the photodiodes that detect the multiple spatial samples. Reference can be made to FIG. 6 that illustrates the angle of incidence relative to a plane containing the photodiodes. The diffraction grating with sensors 104 provides data samples to the processor of the system processor and memory 100 to determine the angle of incidence of the central axis of the laser beam as described subsequently with respect to FIG. 6. In step 302, a positional offset of the plane containing the multiple spatial samples is measured relative to a plane perpendicular to the central axis of the laser beam. The diffraction grating with sensors 104 provides data to the processor of the system processor and memory 100 to determine the angle of incidence of the central axis of the laser beam as described subsequently with respect to FIG. 6. Again, reference can be made to FIG. 6 that illustrates the positional offset of the plane of the laser beam relative to the central axis of the sensor. In step 304, the offset linear slices are converted spatially by the processor to provide centered linear slices to enable calculation of the Gaussian that the offset linear slices do not provide. The conversion is accomplished by creating a projection of the plane containing the multiple spatial samples onto the plane perpendicular to a propagation of the beam for the Gaussian profile using the positional offset to provide the centered linear slices. Finally in step 306, the centered linear slices determined are used by the processor to construct the Gaussian profile.

FIG. 4 is a high level flow diagram of one embodiment of steps to determine the angle of incidence in method step 300 of FIG. 3. The steps of FIG. 3 are performed using the processor of the system processor and memory 100 along with the diffraction grating with sensors 104 of FIG. 1. Initially in step 400, an array of diffraction spectral peaks is obtained from the laser beam strike using the diffraction grating with sensors 104. Next in step 402, a transform is applied by the processor to arrange the diffraction spectral peaks into a square grid of regularized peaks. Next in step 404, convolution kernels are applied to determine a position of a central peak in the square grid of regularized peaks. Finally, in step 406, a position of the central peak is used by the processor to calculate the angle of incidence of the axis of the laser beam relative to the power detector which contains the sensors of the diffraction grating provided in the power detector system.

FIG. 5 is a high level flow diagram of one embodiment of steps to measure the irradiance profile I from the method step 200 of FIG. 2. As in FIG. 2, the steps of FIG. 5 are performed using the processor of the system processor and memory 100 in conjunction with the photodiode irradiance power sensors 102 of FIG. 1. In a first step 500, the irradiance profile is obtained from measurements of irradiance from the photodiode irradiance power sensors 102 using the processor of the system processor and memory 100 using the following equation:

$$I = I_0 \exp\left[-2r^2/w^2\right]$$

To determine I, in step 502, the beam irradiance I is first measured by the processor at a point on the Gaussian profile determined using one of the spatial samples from the photodiodes. In step 504, Io is determined by the processor as the peak beam irradiance of the Gaussian laser profile which is an irradiance I at the center of the beam. In step 506, w is determined by the processor using the photodiode measurements as the beam radius which is a distance from the center of the beam to a position where power is reduced to $1/e^2$. Finally, in step 508, the radius r is determined by the processor from the photodiodes with r being a distance from a center of the Gaussian to a measurement point. Further calculations made by the processor also use the parameter c of the Gaussian which is described to follow.

The irradiance I can also be expressed as follows:

$$I = 2P/\pi \ w^2 \cdot \exp\left[-2r^2/w^2\right]$$

with P being the total power in the beam.

For a radially symmetric Gaussian, the equation for I, or I(r) expressed in terms of radius, can be given as follows:

$$I(r) = I_o e^{-cr^2}$$

This equation for I in cartesian coordinates, or I(x,y), with peak position $(u_x, u_y)$ relative to the sensor position, is given by:

$$I(x, y) = I_o e^{-c[(x-\mu_x)^2 + (y-\mu_y)^2]}$$

The total laser power can be calculated as:

$$P = \pi I_0 / c^2$$

Because detection of the laser beam only provides a sampling of irradiance at the points detected, the Gaussian provides a irradiance profile for determining the total power P based on the sampling received. The irradiance profile depends on distance r from the origin, or beam center, from which the irradiance signals received are located. Details of how the photodiode sensors can be used by the processor to take slices of the total Gaussian with such offsets are described with respect to subsequent figures that illustrate how the slices taken off center of the beam can be used to determine the total Gaussian. Gaussian functions used herein represent the solution to a diffraction limited light beam propagation. A Gaussian function measured can then be used to determine the total irradiance profile I(r) expressed previously above with manipulation to account for any offset from the center of the beam where the Gaussian function is taken. Identification of such offsets are and how the total Gaussian can be determined with the offsets taken into consideration are provided in the following sections.

FIG. 6 is a block diagram showing a laser source 602 and a plane 604 supporting the photodiodes of the photodiode irradiance power detectors 102 of FIG. 1 that illustrates both an angle of incidence and a positional offset of the laser beam relative to the plane of photodiodes used to determine laser power from a Gaussian in the method illustrated in FIG. 3. As shown in FIG. 6, the angle of incidence is the angle between the incoming laser beam and a line normal to a center of the plane 604 supporting the photodiodes. The positional offset is between the emitted laser beam center and the center of the photodiode sensor plane 604 supporting the photodiodes, with the positional offset being measured in one embodiment as the offset between the center of the laser beam and the center of the sensor array in terms of distance from the center of the beam to a position where power is reduced to $1/e^2$ (506).

Figure 7:
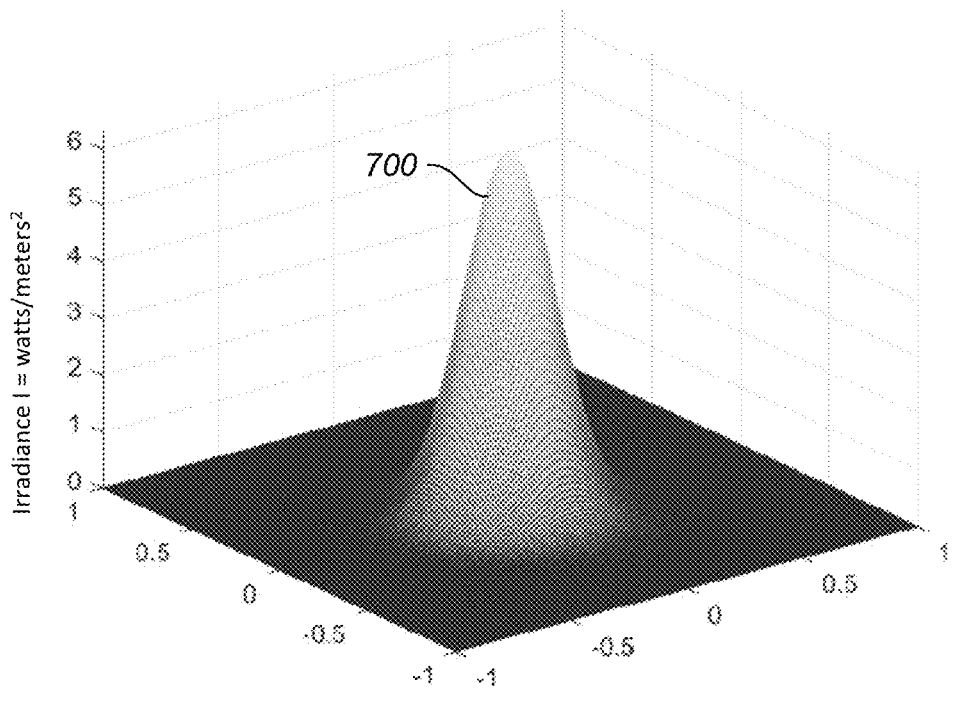
FIG. 7 is a three dimensional graph illustrating a Gaussian profile of a laser beam strike.

FIG. 7 is a three dimensional graph illustrating a total Gaussian profile 700 of a laser beam obtained by taking the irradiance at multiple points according to the steps of FIG. 5 and then obtaining the Gaussian profile according to the method of FIG. 2. The vertical axis of the graph shows measured irradiance I in watts/meter$^2$ of the Gaussian profile 700. The horizontal axis plane shows a distance from the center of the beam along an x-y axis plane, with the center of the beam being the distance at 0 meters and other distances away from the beam center being expressed in meters of 0.5, 1.0, −0.5 and −1.0. The photodiode irradiance power detectors 102 only take a partial measurement, or one or more slices, of the total Gaussian profile 700. Embodiments described subsequently herein enable the total Gaussian profile 700 to be created from those slice measurements.

Figures 8, 9:
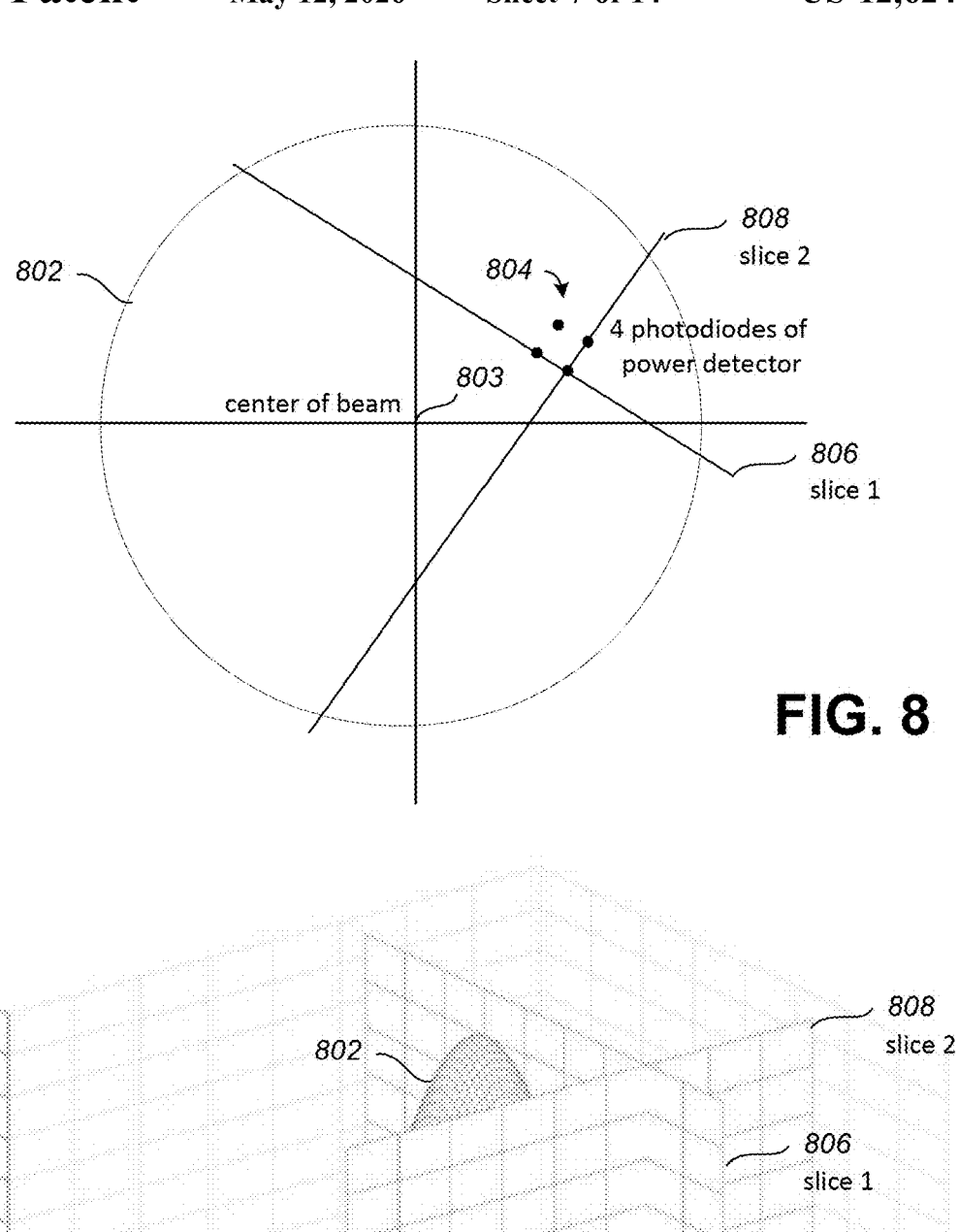
FIG. 8 illustrates two slices taken by two pairs of photodiodes through the Gaussian profile for a laser beam, such as illustrated in FIG. 7.
FIG. 9 is a three dimensional graph illustrating the Gaussian profile of a laser beam and the two slices of FIG. 8.

FIG. 8 illustrates two slices measured by two pairs of photodiodes through the Gaussian profile for a laser beam, such as illustrated in FIG. 7. The slices are determined by measurement of irradiance I from at least a pair or sensors using the mathematical formula for I described with respect to FIG. 5. With more and more measured slices beyond which a Gaussian can be uniquely defined, the calculations according to FIG. 2 can be used to determine the entire Gaussian with higher accuracy, for example, by minimizing the sum of errors. In FIG. 8, circle 802 illustrates the beam strike on the laser power detector. Crosshairs converging illustrate the location of the center of the beam 803 where the peak irradiance $I_0$ is obtained. Four photodiode power detectors 804 are placed in a plane at the corners of the power detector 102 of FIG. 1 and provide measurements for detection slices, slice 1 806 and slice 2 808. The slices take measurement of a portion of the Gaussian profile. Two of the photodiode detectors 804 are used to measure each of the slices 806 and 808 of FIG. 8. Although not shown, additional slices can be taken using combinations of two of the photodiodes to better characterize the Gaussian profile.

FIG. 9 is a three dimensional graph showing the Gaussian profile of a laser beam 802 and the two slices 806 and 808 taken with photodiode sensors shown in FIG. 8. As indicated with respect to FIG. 8, as more and more slices such as 806 and 808 of the Gaussian are obtained, the full Gaussian 802 can be determined with higher accuracy. The three-dimensional full Gaussian profile 802 is similar to the Gaussian profile shown in three dimension in FIG. 7, with the vertical and horizontal axis having the same measurement scale. The beam of the full Gaussian 802 in FIG. 9 is only shown as a circle in two dimensions in FIG. 8 for illustration purposes. The slices 806 and 808 shown as a line in two dimensions in FIG. 8 form slice planes in FIG. 9 that cut through a portion of the full three dimensional Gaussian profile 802 in FIG. 9.

Figure 10:
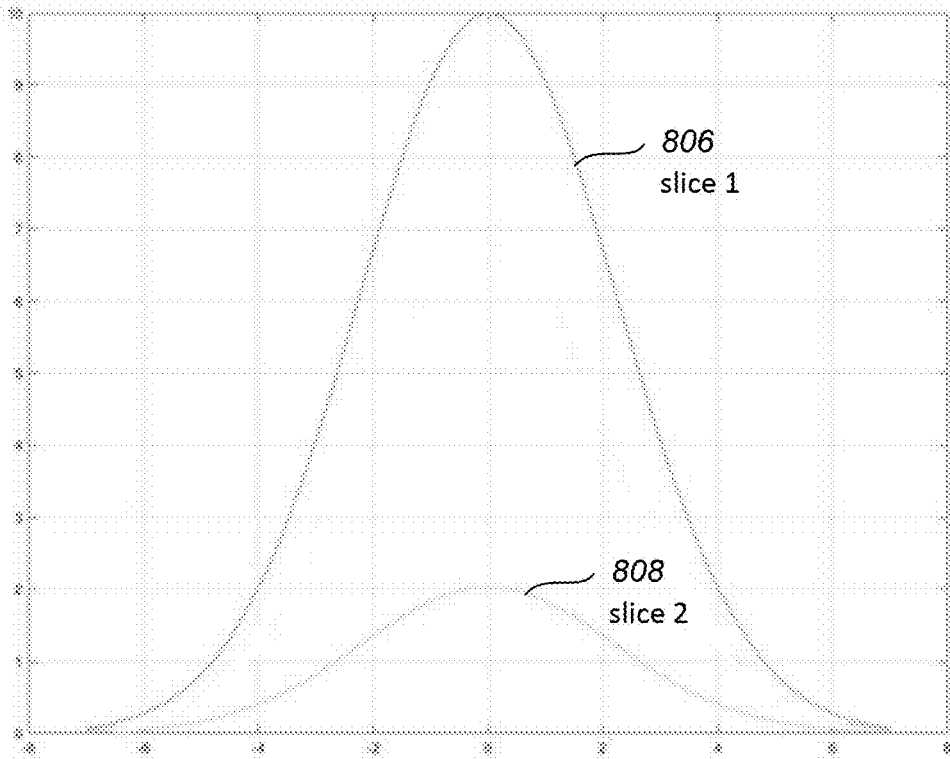
FIG. 10 is a two dimensional graph illustrating the two slices from FIG. 9.

FIG. 10 is a two-dimensional graph illustrating the power level measurement of the two slices 806 and 808 that are shown in the three-dimensional graph in FIG. 9. Measurement of the irradiance power level in two-dimensions for each slice can be used along with multiple additional slices to obtain the full Gaussian profile in three-dimensions. The x-axis scale in FIG. 10 shows distance in meters from the peak of the Gaussian to the slice with 0 being at the center. The y-axis scale shows irradiance power level in Watts/meter$^2$. Because of the location that the slice cuts through the Gaussian profile 802, a slice cut closer to the peak has a greater amplitude than a slice taken farther from the peak. The slice 1 806 is closer to the Gaussian peak than slice 2 808 as shown in FIG. 10. Since the slices are not taken at the peak, information is needed on the location of the slice taken relative to the Gaussian peak which will be described with respect to subsequent drawings.

FIG. 11 illustrates the needed location information of the slices shown in FIG. 10 taken using the power detector relative to the Gaussian peak to determine the Gaussian, with FIG. 11 providing three position illustrations 1100, 1102 and 1104 each showing a laser source and power detector to illustrate the needed angle of incidence of the center of a laser beam relative to the center of a power detector as well as an offset angle of the power detector that are needed to calculate laser power after obtaining offset slice measurements according to the steps of FIG. 3. Block diagram 1100 shows when the center of the laser beam from the laser power source is aligned with the center of the power detector. In this case the angle of incidence is 0 degrees and the offset angle is zero degrees, so calculations due to the offsets are not warranted. Block diagram 1102 shows the laser beam having an angle of incidence relative to the normal of the plane of the power detector, or in other words the direction of the normal axis of the sensor is offset from the direction from the sensor to the laser source. Block diagram 1104 shows the center of the laser beam having a positional offset relative to the center of the power detector, or in other words the direction of the emitted laser beam is offset from the direction from the laser to the detector.

FIG. 12 provides more detail to illustrates the offset angle and angle of incidence initially illustrated in FIG. 11 by providing a two-dimensional block diagram of a slice of the laser beam and showing relative positions for power detectors to illustrate the offset angle and angle of incidence measurement used in the steps of FIG. 3 to determine irradiance from the measured slices illustrated with respect to FIGS. 8-10. In FIG. 12 a power detector 1202A is first shown with a center placed at the center of the laser beam while another power detector 1202B is shown with center placed at an angle of incidence relative to the laser beam as well as having an offset angle. First, with power detector 1202A, a center of the laser beam is aligned with a center of the detector, and the detector has no angle of incidence or offset angle relative to the laser beam. Power detector 1202B, however, has both an angle of incidence and an offset angle relative to the laser beam. For both power detector 1202A and 1202B, it can be seen where on the graph of the slice the irradiance level will be, with detector 1202B being reduced in irradiance due to both the angle of incidence and offset angle of the laser beam relative to the detector.

Figure 13:
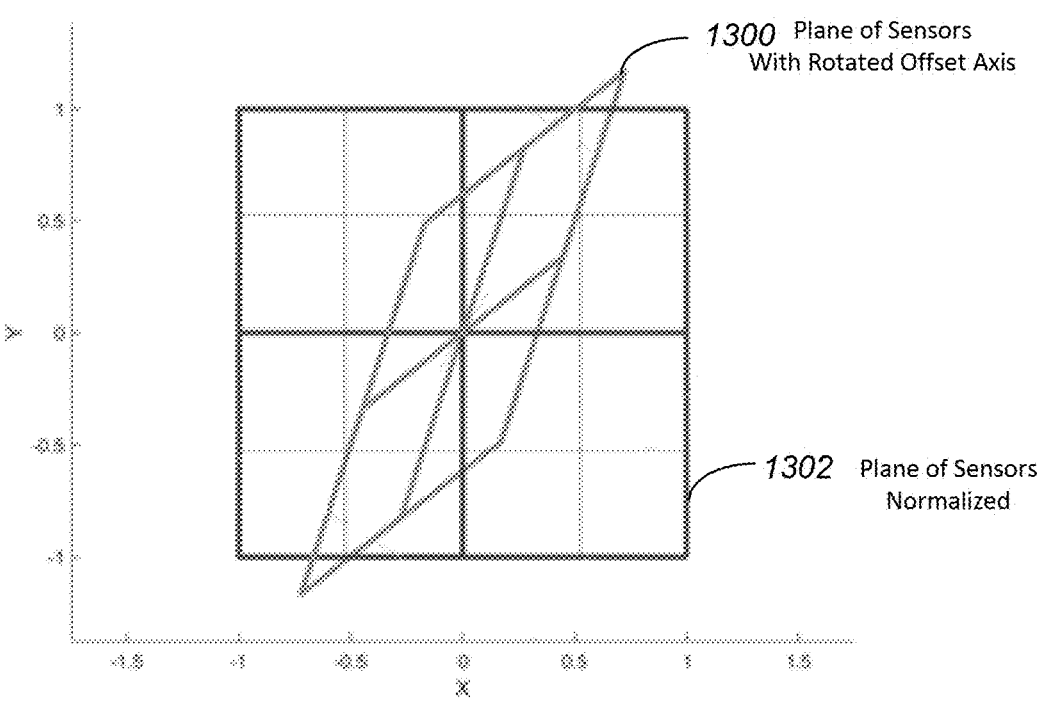
FIG. 13 illustrates a plane of sensors at an offset angle relative to a plane perpendicular the central axis of the laser beam as well as a normalized reference plane of sensors showing rotation to align with the plane perpendicular to the axis of the laser beam.
Figure 14:
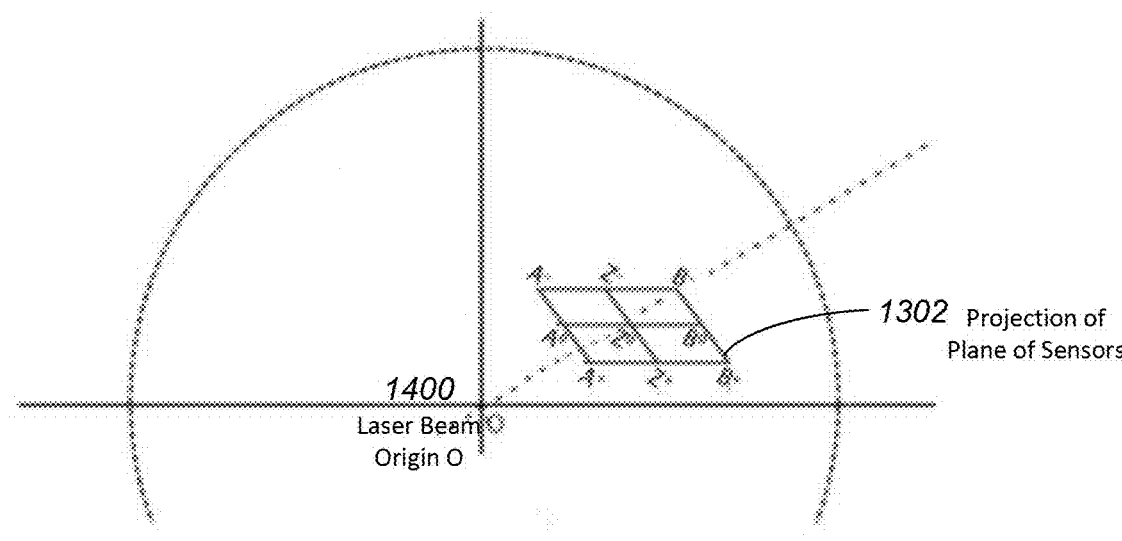
FIG. 14 shows a graph of the origin of the laser beam and central axis of the laser beam relative to the normalized reference plane of sensors.
Figure 15:
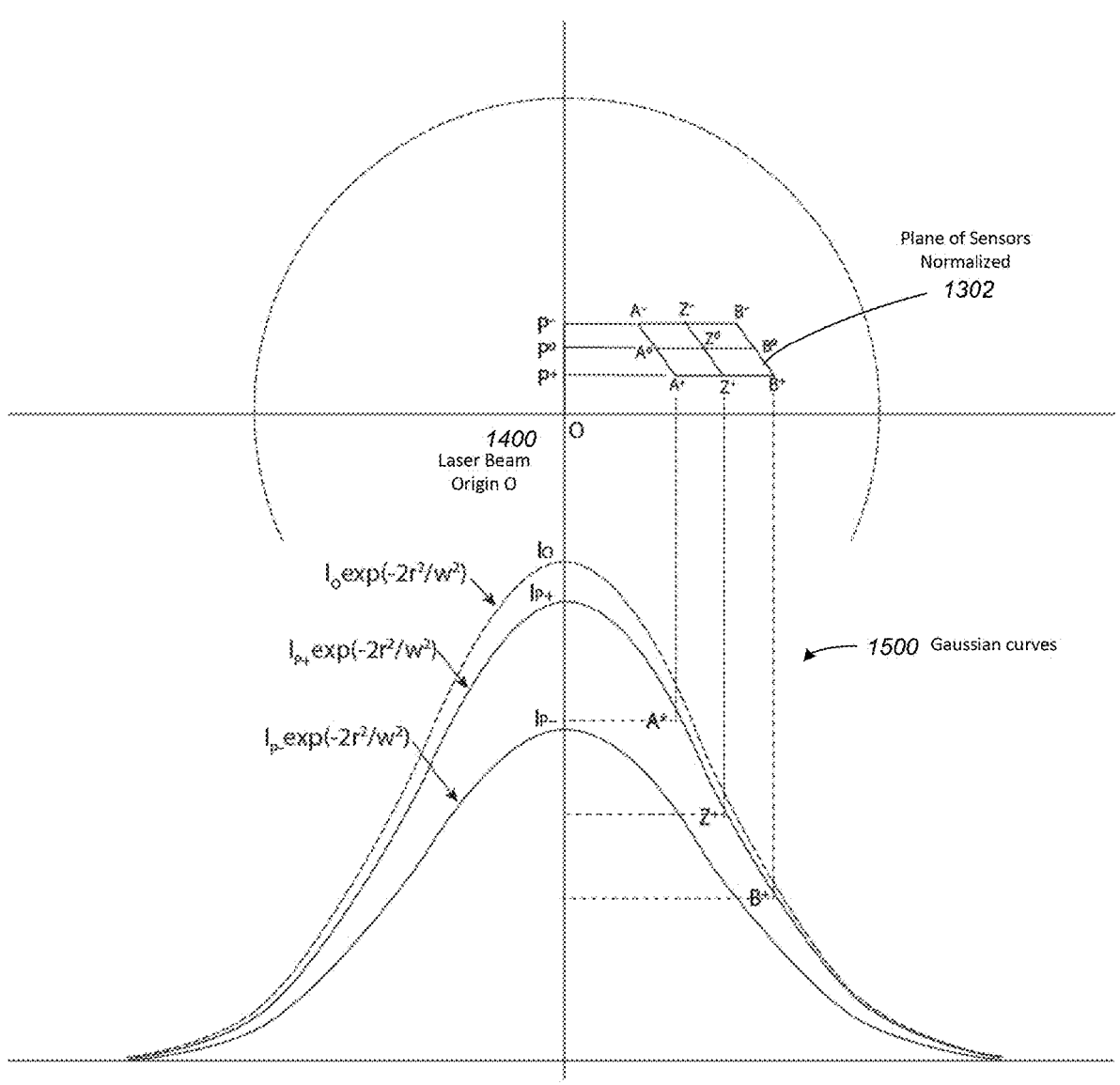
FIG. 15 shows a graph with points from the laser origin O and from the normalized planes of sensors projected onto Gaussian curves to provide for a determination of a Gaussian profile using a Gaussian profile algorithm.

FIGS. 13-15 illustrate determination using an offset angle of a plane of the sensors 1300 relative to a plane perpendicular to the central axis of the laser beam to create a projection of the plane containing the multiple spatial samples onto the plane perpendicular to a propagation of the beam for the Gaussian profile to normalize and center the centered linear slices for accurate calculation of the Gaussian profile when there is an offset angle. FIG. 13 illustrates a plane of sensors 1302 projected onto a plane perpendicular the central axis of the laser beam 1300 showing rotation to normalize and align with the plane perpendicular to the axis of the laser beam. As laser angle of incidence changes from normal, the effective sensor array will be a linear transform of the original square as illustrated with respect to FIG. 16. Thus, a linear transform can be applied to the sensor grid at points in the plane of sensors to determine the normalized plane of sensors when the plane of sensors is rotated. An indication of the rotation of the plane of sensors is provided from the diffraction grating with sensors 104 of FIG. 1.

FIG. 14 shows a graph of the origin of the laser beam and central axis of the laser beam relative to the normalized reference plane of sensors. FIG. 14 is used to illustrate mathematical transforms that can be applied to rotate the reference plane and normalize the plane of sensor positions due to radial symmetry. The rotation can be done by using radial coordinates or cartesian coordinates to facilitate computation. Because of the symmetry, the rotation of the reference axis can be made to align segments $A^-Z^-B^-$, $A^0Z^0B^0$ and $A^+Z^+B^+$ to be parallel to the x-axis. The segments $A^-A^0A^+$, $Z^-Z^0Z^+$ and $B^-B^0B^+$ are parallel to each other.

FIG. 15 shows a graph with points from the laser origin O 1400 and from the normalized planes of sensors 1302 of FIG. 14 projected onto Gaussian curves to provide for a determination of a Gaussian profile using a Gaussian profile algorithm. FIG. 15 is used to illustrate how power detector photodiode sensor data with an offset angle can be normalized or converted to data without such an offset angle. To use the offset angle to normalize the slice data, in accordance with embodiments the following calculations are made to convert the photodiode sensor data from the photodiode sensors of the photodiode irradiance power detectors 102 of FIG. 1. First, reference is made to the Gaussian irradiance profile for Io, $I_{P+}$ and $I^{P-}$ that are shown subsequently expressed in radial coordinates provided previously herein as follows:

$$I = I_0 \exp\left[-2r^2/w^2\right]$$

This irradiance can be expressed in cartesian coordinates as indicated previously herein as follows:

$$I(x, y) = I_O e^{-2\frac{(x-\mu_x)^2 + (y-\mu_y)^2}{w^2}}$$

Using these equations, the following demonstrates the key concept of using the Gaussian profile algorithm for a fast Gaussian profile characterization based on taking slices of the Gaussian along lines of the plane of sensors and normalizing the plane when there is an offset. The irradiance profile Iz can be determined from a slice along PZ which is cut from Gaussian profile from segment PZ as follows:

$$I_Z(r) = I_P e^{-2\frac{(r-\mu_P)^2}{w^2}}$$

Note that slice PZ can be made from $P^+Z^+$ and $P^-Z^-$ to determine values for $I_{Z^-}$ and $I_{Z^+}$ that are provided on Gaussian profile curves 1500.

For the algorithm, Z is first set to zero. A length s is defined as the length of segment AZ and ZB. For PZ, given the values $(-s, I_A)$, $(0, I_Z)$, $(s, I_B)$, the algorithm finds Ip and wp and $\mu_P$=PZ. For a slice along $P^+Z^+$, the algorithm finds $I_{P+}$, $w_{P+}$ and $\mu_{P+}$=$P^+Z^+$. For a slice along $P^-Z^-$, the algorithm finds $I_{P-}$, $w_{P-}$ and $\mu_{P-}$=$P^-Z^-$.

Next for a slice OP, the algorithm uses the following equations:

$$I_P = I_O e^{-2\frac{OP^2}{w^2}} \text{ and } OP^- = OP^+ + P^+P^-$$

Then given w, $I_{P+}$, $I_{P-}$, and $P^+P^-$ the algorithm finds $OP^+$, $OP^-$ and $I_0$.

Figure 16:
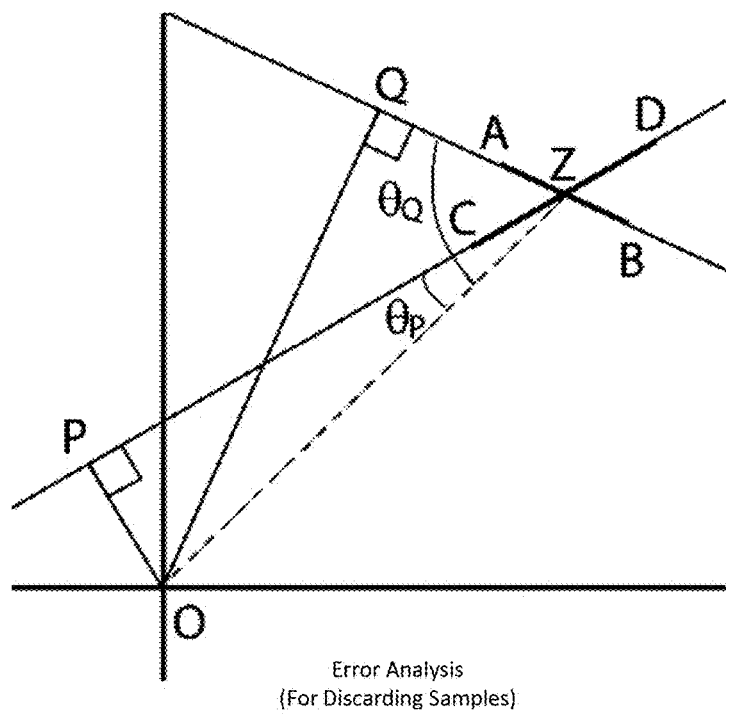
FIG. 16 provides a graph to illustrate how individual measurement points can be evaluated to determine measurement accuracy enabling inaccurate sensor measurements to be discarded.

FIG. 16 provides a graph to illustrate how individual normalized measurement points from the calculations above made with respect to FIG. 15 can be evaluated to determine measurement accuracy, enabling inaccurate sensor measurements to be discarded. Based on criteria determined using FIG. 16, measurements points outside the desired error accuracy range can be evaluated and discarded when outside an accuracy range. Irradiance measured at point Z in FIG. 16 can be expressed using the following three Gaussian equations:

$$I_Z = I_O e^{-2\frac{OZ^2}{w^2}} = I_O e^{-2\frac{OZ^2}{w^2}} = I_P e^{-2\frac{PZ^2}{w^2}}$$

Also, the following equations are used in determining measurement accuracy:

$$I_Q =$$

$$I_O e^{-2\frac{OQ^2}{w^2}} \quad I_P = I_O e^{-2\frac{OP^2}{w^2}} \quad \frac{w^2}{2} \ln \frac{I_Z}{I_O} = OZ^2 = OQ^2 + QZ^2 = OP^2 + PZ^2$$

These equations can be represented using two right triangles sharing a hypotenuse as shown in FIG. 16.

Determining samples to reject, is performed with use of the graph of FIG. 16. A sample is rejected based on the following conditions. First, if an insufficient gradient is found among the irradiance sample points $I_A$, $I_B$, $I_C$, $I_D$, and $I_Z$. Second, if estimates of w from the samples in planes AZD and CZB do not agree. Third, if estimates of $I_O$ from the samples in planes AZD and CZB do not agree. Finally, if the beam radius, w, is too small (<4 cm) or too large (>4 m).

Figure 17A:
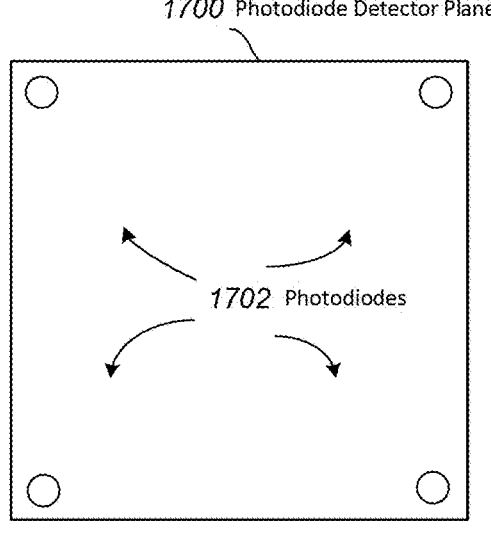
FIG. 17A is a high level diagram showing a plane of the power detector supporting four photodiodes, one at each corner of a square.
Figure 17B:
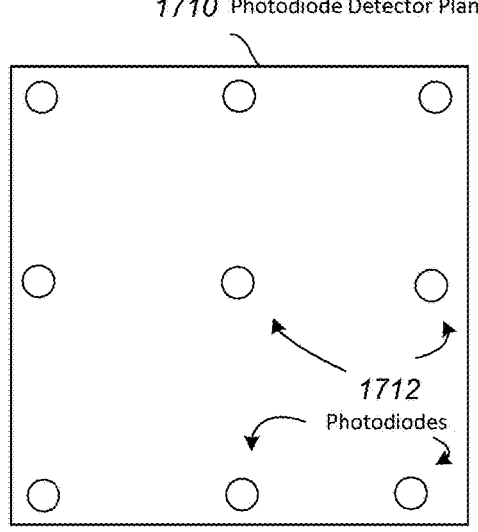
FIG. 17B is a high level diagram showing a plane of the power detector supporting nine photodiodes, four at the corners of a share, four at midpoints of the square between the corners and one at the center.

FIGS. 17A and 17B illustrate possible configuration of photodiodes in a planar array of photodiodes of the photodiode irradiance power detectors 102 of FIG. 1 as mounted on a laser detector platform. FIG. 17A is a high level diagram showing a plane of the power detector supporting four photodiodes 1702, one at each corner of a square as mounted in on a platform forming a photodiode detector plane 1700. FIG. 17B provides a high level diagram showing a photodiode detector plane 1710 of the power detector supporting nine photodiodes 1712, four at the corners of a share, four at midpoints of the square between the corners and one at the center. Because more slice measurements can be made with more combinations of pairs of photodiodes, a better measurement of the Gaussian profile can be made with more sensors. Although FIGS. 17A and 17B show two possible arrangements or photodiodes on a platform, different numbers of photodiodes and a different arrangement of the photodiodes are possible within the discretion of a system designer.

The sensors included in laser power detector platform include separate photodiode irradiance power detectors 102 and diffraction grating with sensors 104 shown in FIG. 1. The photodiode irradiance power detectors 102 and diffraction grating with sensors 104, are separate units with separate sensors to make different sensing measurements. The photodiode power detectors 102 are used to measure irradiance for offset Gaussian slices as described previously herein. The diffraction grating with sensors 104 is used to determine a laser beam central axis location position to enable determination of the angle of incidence of the laser beam central axis relative to an axis through the center of the diffraction grating with sensors 104. The center of the diffraction grating with sensors will be located on the power detector device in close proximity to the photodiode power detectors 102 which will, thus, be assumed to have the same center.

Figure 18:
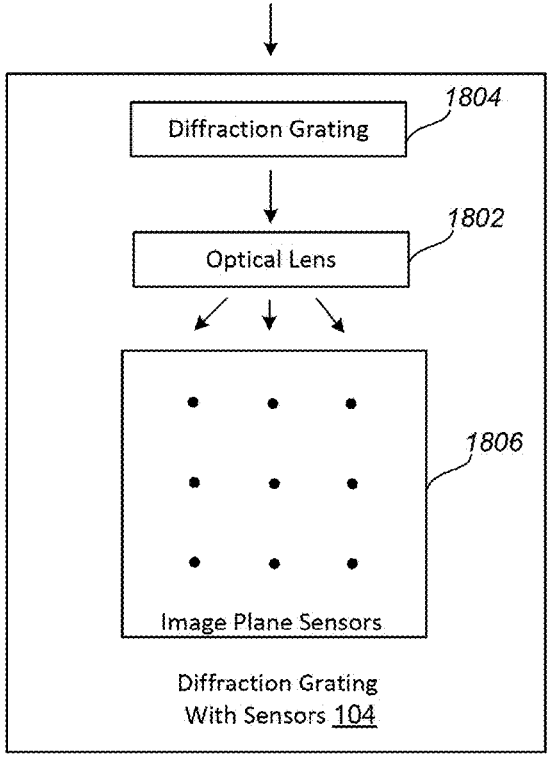
FIG. 18 is a block diagram showing components of the diffraction grating with sensors as shown in block diagram from FIG. 1.

FIG. 18 is a block diagram showing components of the diffraction grating with sensors 104 of FIG. 1 that takes measurements used to calculate the angle of incidence of the laser relative to a central axis of a plane of the photodiode sensors in the photodiode detector irradiance power detectors 102. The diffraction grating with sensors 104 includes a diffraction grating 1802 and optical lens 1804 that focuses the diffraction pattern onto an imaging sensor. The diffraction grating 1804 and optical lens 1804 forms a regular array of diffraction spectral peaks onto image plane sensors 1806 when a laser beam is received. Although not shown, an additional optical lens can be provided on the opposing side of the diffraction grating 1804 to create a lens assembly.

The signals from the image plane sensors 1806 of FIG. 18 are provided to a processor and memory system 100 as shown in FIG. 1. The processor uses software to then apply the steps of FIG. 4 to determine the angle of incidence using the signals from the image plane sensors 1506 of the diffraction grating. The processor first applies a transform that arranges the spectral peaks into a square grid of regularized peaks which is the method step 402 of FIG. 4. Further, after applying the transform, the processor uses convolution kernels to determine a central peak in the square grid of regularized peaks of method step 404 of FIG. 4. The central peak is used to identify the location of the peak of the laser beam. The processor thus implements step 406 of FIG. 4 by using the central peak determination to calculate the angle of incidence of the axis of the laser beam relative to a central axis normal to the plane containing the photodiode sensors of the power detector system.

Further measurements in addition to total laser power can be determined using the power detection system with embodiments described herein. The measurement of peak irradiation power Io at the laser beam central peak can be determined using both the photodiode irradiance power detectors 102 and diffraction grating with sensors 104 of FIG. 1. Such peak irradiation power Io enables determination if an individual could have been exposed to the maximum permissible exposure (MPE) of the laser. Further measurements include wavelength of the laser source laser beam provided from the diffraction grating with sensors 104, and beam propagation information from use of the photodiode irradiance power detectors 102, all enabling the laser source to be identified. Such identification of the laser source can enable authorities to identify a manufacturer that can be used to locate the person who is currently using the laser source.

Figure 19:
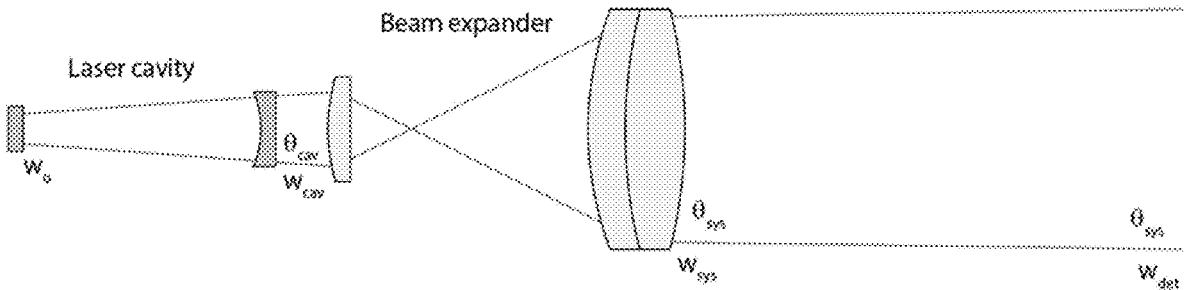
FIG. 19 shows components of a laser source along with a beam expander with a laser source.

FIG. 19 shows components of a laser source cavity along with a beam expander to illustrate calculation of parameters of the laser beam propagation including beam divergence and beam expander magnification power (MP). Further characterizing information of the laser source to enable identification of the laser source type and manufacturer that can be determined from the Gaussian profile and laser source position include the beam divergence and magnification power (MP). Beam divergence is an angular measure of the increase in beam diameter or radius with distance from the optical aperture or antenna aperture from which the beam emerges. A beam expander provides magnification lenses to make it possible to reduce the diameter of the beam at maximum range. The photodiode irradiance power detectors 102 of FIG. 1 provide determination of the beam diameter which along with beam position information provided from the diffraction grating with sensors 104 of FIG. 1 to enable measurement of such parameters.

Based on the information on the wavelength beam radius and distance to the laser provided by the photodiode sensors of the photodiode irradiance power detectors 102 of FIG. 1, the magnification power of the source optics can be calculated based on assumptions of the beam waist. This provides general information on the level of sophistication of the laser source. The laser beam begins with a width $w_0$. After passing through the lens of the laser cavity, the width increases to $w_{cav}$ and the beam has a divergence angle $\theta_{cav}$. After passing through the beam expander lens system, the beam width increases to $w_{sys}$ and the divergence angle increases to $\theta_{sys}$. At the power detector, the beam width is $w_{det}$.

From the parameters shown in FIG. 19, the beam divergence and magnification power (MP) can be calculated. The half beam divergence is expressed as follows:

$$\theta = \frac{\lambda_o}{\pi w_o}$$

Further the MP can be expressed as follows:

$$MP = \frac{\theta_{cav}}{\theta_{sys}}$$

For a large z, or distance from the photodiode sensors to the laser source, meaning $w \approx \theta_{sys} z$, MP can be expressed as follows:

$$MP = \frac{z\lambda_o}{\pi w w_o}$$

Figure 20:
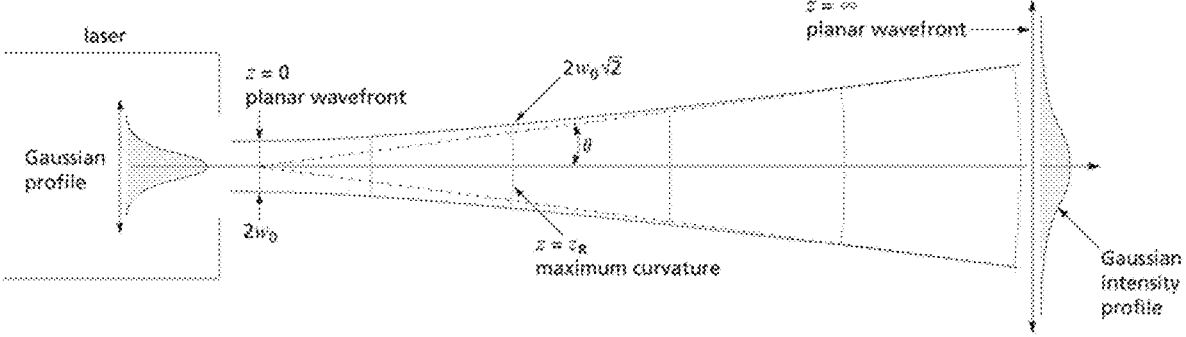
FIG. 20 illustrates a Gaussian beam propagation with measurement of irradiance and laser source distance enabling determination of beam divergence and Rayleigh range including when a beam expander is used.

FIG. 20 illustrates a Gaussian beam propagation with measurement of irradiance and laser source distance further enabling determination of beam propagation information to identify the laser source, including beam divergence and Rayleigh range including when a beam expander is used. The data for determining the beam divergence and Rayleigh range is obtained from the photodiodes of the photodiode irradiance power detectors 102 of FIG. 1. In FIG. 20, the laser source provides the Gaussian profile shown that is detected with the photodiodes. At the laser source, or a distance of z=0, the planar wavefront has a beam width $2w_0$. At a distance $z=z_R$ which is expressed as the Rayleigh length, the beam width increases to $2w_0\sqrt{2}$. Finally at the detector, the distance from the laser source is illustrated as z=∞. The planar front of the Gaussian profile, thus, extends from the laser source to the planer wavefront where the Gaussian intensity profile is measured. The maximum curvature of the beam occurs at distance from the laser source $z=z_R$ which is the Rayleigh length. The parameters provide for evaluation of waist size as a function of distance $w^2(z)$. The equation for waist size as a function of distance is as follows:

$$w^2(z) = w_o^2\left[1 + \frac{\lambda_o z}{\pi w_o^2}\right] = w_o^2\left[1 + \left(\frac{z}{z_R}\right)^2\right]$$

Beyond the Rayleigh range, which will be the case for virtually all laser hits, the equations describe the waist size and half beam divergence. At long distances, the beam front is assumed to be planar. The Rayleigh length can then be expressed as follows:

$$z_R = \frac{\pi w_o^2}{\lambda_o}$$

The beam divergence is then typically expressed as:

$$\frac{\theta}{2} = \frac{\lambda_o}{\pi w_o}$$

Based on the measured irradiance profile and laser distance and an estimate of wo, the data can be fit with these equations to obtain beam divergence and an estimate of the aperture of the laser optics (e.g. beam expander) can then be characterized.

With above information, the following set of equations describe the Gaussian beam propagation, including the expression for the field and radius of curvature of the wavefront.

$$\frac{E(x, y, z)}{E_o} = \frac{w_o}{w(z)}\exp\left[-\frac{r^2}{w^2(z)}\right]\exp\left\{-j\left[kz - \tan^{-1}\left(\frac{z}{z_o}\right)\right]\right\}\exp\left[-j\frac{kr^2}{sR(z)}\right]$$

$$R(z) = z\left[1 + \left(\frac{\pi n w_o^2}{\lambda_o z}\right)^2\right] = z\left[1 + \left(\frac{z_R}{z}\right)^2\right]$$

Magnifying power (MP) can be related to beam divergence. The smaller the waist radius the larger the beam divergence. With this in mind, the following equations can be used to better determine MP. First, the product of the waist radius and beam divergence can be assumed to be constant as shown below.

$$\frac{\theta}{2} = \frac{\lambda_o}{\pi w_o} \rightarrow \theta \cdot w_o = const$$

Advanced laser systems (e.g. laser designators) expand the output beam diameter to reduce divergence. A beam expander increases input laser beam diameter by the expansion power while decreasing the divergence by the same expansion power. A laser beam expander is designed to increase the diameter D of a collimated input beam to a larger collimated output beam. The value of MP can thus be expressed as follows:

$$MP = \frac{\theta_I}{\theta_O} = \frac{D_O}{D_I|}$$

Magnifying power is the ratio of input to output divergence which is equal to output to input beam diameters. The beam diameters can be related as follows.

$$D_O = D_I + z\tan\theta_I = MP \cdot D_I + z\tan\frac{\theta_I}{MP} = MP \cdot D_I + z\tan\theta_I$$

Given $D_0$ (Gaussian sensor), z (main sensor), and $\theta_I$ (typical DPSS laser parameter), MP can be characterized and thus the size of the laser system aperture determined. This will provide information on the level of sophistication of the laser source, and in particular, if the source is a laser designator.

The power detection system described can further provide an indication if a detected light source is a laser or a non-laser. A non-laser source can be detected if multiple samples provided from the photodiode sensors of the photodiode irradiance power detectors 102 of FIG. 1 indicate that the laser profile is not Gaussian. The output of the diffraction grating with sensors 104 of FIG. 1 can be applied through convolution kernels to further determine wavelength detected, and because a laser is single wavelength, broad wavelength spectra received and detected from the photodiodes are an indication that the source is a non-laser. The photodiode sensors can further detect a non-laser by determining pulse rate and pulse width of light received. Although the photodiode sensors of the photodiode irradiance power detectors 102 of FIG. 1 can be used to detect pulse rate and pulse width, separate pulse sensors 105 as shown in FIG. 1 can be used for rapid pulse detection to determine if light received is from a laser to enable elimination of non-laser light from measurement considerations.

The subject matter described herein may be embodied in systems, apparatus, methods, and/or articles depending on the desired configuration. In particular, various implementations of the subject matter described herein may be realized in computer software, firmware or hardware and/or combinations thereof, as well as in digital electronic circuitry, integrated circuitry, and the like. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, applications, components, or code) include machine instructions for a programmable processor and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs), but not limited thereto) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, certain the subject matter described herein may be implemented on a computer having a display device (e.g., a touch-sensitive display, a non-touch sensitive display monitor, but not limited thereto) for displaying information to the user and a keyboard, touch screen and/or a pointing device (e.g., a mouse, touchpad or a trackball, but not limited thereto) by which the user may provide input to the computer. Other kinds of devices may be used to provide for interaction with a user, administrator and/or manager as well; for example, feedback provided to the user, administrator and/or manager may be any form of sensory feedback (e.g., visual feedback, auditory feedback, or tactile feedback); and input from the user may be received in any form, including acoustic, speech, or tactile input, depending upon implementation.

The subject matter described herein may be implemented in a computing system that includes a back-end component (e.g., as a data server), or that includes a middleware component (e.g., an application server), or that includes a front-end component (e.g., a client computer having a graphical user interface (GUI) or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include, but are not limited to, a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts.

While various embodiments of the present technology have been described above, it should be understood that they have been presented by way of example, and not limitation. It will be apparent to persons skilled in the relevant art that various changes in form and detail can be made therein without departing from the spirit and scope of the technology. For example, although a few variations have been described in detail above, other modifications or additions are possible. In particular, further features and/or variations may be provided in addition to those set forth herein. For example, the implementations described above may be directed to various combinations and sub-combinations of the disclosed features and/or combinations and sub-combinations of several further features disclosed above. In addition, the logic flow depicted in the accompanying figures and/or described herein do not require the particular order shown, or sequential order, to achieve desirable results. Other embodiments may be within the scope of the following claims.

Embodiments of the present technology have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed technology. One skilled in the art will recognize that these functional building blocks can be implemented by discrete components, application specific integrated circuits, processors executing appropriate software and the like or any combination thereof.

The breadth and scope of the present technology should not be limited by any of the above-described exemplary embodiments but should be defined only in accordance with the following claims and their equivalents.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for determining total laser power for a laser, comprising:

taking multiple spatial samples of a laser beam strike on a planar array of a plurality of detectors, each of the spatial samples received from a corresponding one of the detectors;

measuring an irradiation profile of the laser beam strike for each of the multiple spatial samples of the laser beam strike to separately identify linear offset Gaussian slices for each of the multiple spatial samples;

solving for a Gaussian of the irradiation profile to obtain a Gaussian profile of the laser beam, wherein solving to obtain the Gaussian profile comprises:

measuring an angle of incidence of a central axis of the laser beam relative to a normal of plane the planar array;

measuring a positional offset of the planar array relative to a plane perpendicular to the central axis of the laser beam;

creating a projection of the plane in which the plurality of detectors located onto the plane perpendicular to the central axis of the laser beam using a linear transformation based on the positional offset and angle of incidence to provide normalized linear slices; and constructing the Gaussian profiles from the normalized linear slices; and determining the total laser power from the Gaussian profiles.

2. The method of claim 1, wherein the measuring the angle of incidence comprises:

obtaining an array of diffraction spectral peaks from the laser beam strike;

applying a transform to arrange the diffraction spectral peaks into a square grid of regularized peaks;

using convolution kernels to determine a position of a central peak in the square grid of regularized peaks; and using a position of the central peak to calculate the angle of incidence of the axis of the laser beam relative to the spatial samples.

3. The method of claim 2, further comprising determining if the spatial samples are sensing light from a non-laser signal by determining if broad wavelength spectra are obtained from the multiple spatial samples.

4. The method of claim 3, further comprising determining if the spatial samples are sensing light from a non-laser by determining pulse rate and pulse width of light from the multiple spatial samples.

5. The method of claim 1, wherein the multiple spatial samples are measurements of irradiance, I, used to calculate the Gaussian profile wherein the irradiance $I=I_0\exp[-2r^2/w^2]$, with I being the beam irradiance measured at a point on the Gaussian profile determined using one of the spatial samples Io being peak beam irradiance which is an irradiance I at the center of the beam;

w being beam radius which is a distance from the center of the beam to a position where power is reduced to $1/e^2$; and r being a radius which is a distance from a center of the Gaussian to a measurement point.

6. The method of claim 5, wherein values for Io, w and r are determined for one of the linear offset Gaussian slices obtained from a pair of the spatial samples.

7. The method of claim 6, wherein further iterations are provided to refine the Gaussian profile by using additional spatial samples to provide additional linear offset Gaussian slices to determine the Gaussian profile.

8. The method of claim 5, further comprising:

using the peak irradiation power Io to determine if an individual could have been exposed to maximum permissible exposure (MPE) of the laser.

9. The method of claim 1, wherein the total laser power is determined by taking an integral of the Gaussian profile.

10. The method of claim 1, further comprising:

characterizing from parameters of the Gaussian profile beam divergence and magnification power from a beam expander of the laser.

11. The method of claim 1, further comprising determining if the multiple spatial samples are sensing light from a non-laser signal by spatially oversampling points when taking the multiple spatial samples and determining if the oversampled points correspond to a fitted Gaussian.

12. An apparatus for determining total laser power of a laser comprising:

a planar array of photodiode sensors configured to take multiple spatial samples of an irradiation profile from a beam strike of the laser to identify linear offset Gaussian slices for each of the multiple spatial samples used to solve for a Gaussian of the irradiation profile;

a processor connected to the photodiode sensors, the processor configured to:

measure an angle of incidence of a central axis of the laser beam relative to a normal of the planar array;

measure a positional offset of the planar array relative to a plane perpendicular to the central axis of the laser beam;

create a projection of the plane in which the photodiodes are located onto the plane perpendicular to the central axis of the laser beam using a linear transformation based on the positional offset and angle of incidence to provide linear slices;

construct the Gaussian profiles from the normalized linear slices; and determine the total laser power from the Gaussian profiles.

13. The apparatus of claim 12, further comprising:

a diffraction grating with sensors configured to provide an array of diffraction spectral peaks from the beam strike, wherein the diffraction grating provides an array of diffraction spectral peaks from the beam strike, and wherein the processor is connected to the diffraction grating with sensors and is further configured to:

apply a transform to arrange the diffraction spectral peaks into a square grid of regularized peaks;

use convolution kernels to determine a position of a central peak in the square grid of regularized peaks; and use a position of the central peak to calculate the angle of incidence of the axis of the laser beam relative to the diffraction grating.

14. The apparatus of claim 13, wherein the processor is further configured to determine if the spatial samples are sensing light from a non-laser signal by determining if broad wavelength spectra are received from the diffraction grating.

15. The apparatus of claim 14, wherein the processor is further configured to determine if the photodiode sensors are sensing light from a non-laser signal by spatially oversampling points using the photodiode sensors and determining if the oversampled points correspond to a fitted Gaussian.

16. The apparatus of claim 12, wherein the photodiodes are configured to provide measurements of irradiance I used to calculate the Gaussian profile, with I being a beam irradiance measured at a point on the Gaussian profile determined using one of the photodiodes, with the following additional parameters being determined for the Gaussian profile:

peak beam irradiance Io which is an irradiance I at the center of the beam;

beam radius w which is a distance from the center of the beam to a position where power is reduced to $1/e^2$; and radius r which is a distance from a center of the Gaussian to a measurement point, and wherein values for Io, w and r are determined for one or more of the linear offset Gaussian slices obtained using a pair of the photodiodes.

17. The apparatus of claim 12, wherein the photodiode sensors are positioned on a square fixture and wherein the photodiode sensors include four sensors mounted at the corners of the square.

18. The apparatus of claim 17, wherein the photodiode sensors 8 sensors including the four photodiode sensors mounted at the four corners of the square and four photodiode sensors mounted along edges between the corners and further includes a $9^{th}$ sensor mounted near a center of the square.

19. A non-transitory computer readable medium comprising stored instructions which when executed by a processor cause the processor to:

measure an irradiation profile from a beam strike of laser by taking multiple spatial samples of the laser beam strike on a planar array of photosensors to identify linear offset Gaussian slices used to solve for a Gaussian of the irradiation profile;

solve the Gaussian of the irradiation profile for each of the multiple spatial samples to obtain a Gaussian profile of the beam, wherein solving to obtain the Gaussian profile comprises:

measure an angle of incidence of a central axis of the laser beam relative to a normal of the planar array;

measure a positional offset of the planar array relative to a plane perpendicular to the central axis of the laser beam;

create a projection of the plane in which the photodiodes are located onto the plane perpendicular to the central axis of the laser beam using a linear transformation based on the positional offset and angle of incidence to provide normalized linear slices; and construct the Gaussian profiles from the normalized linear slices; and determine the total laser power from the Gaussian profiles.

20. The non-transitory computer readable medium of claim 19, wherein the measuring the angle of incidence comprises:

obtaining an array of diffraction spectral peaks from the laser beam strike;

applying a transform to arrange the diffraction spectral peaks into a square grid of regularized peaks;

using convolution kernels to determine a position of a central peak in the square grid of regularized peaks; and using a position of the central peak to calculate the angle of incidence of the axis of the laser beam relative to the spatial samples.

* * * * *